F. WIARD.
MILLING CUTTER.
APPLICATION FILED JAN. 19, 1921.
1,397,119.
Patented Nov. 15, 1921.
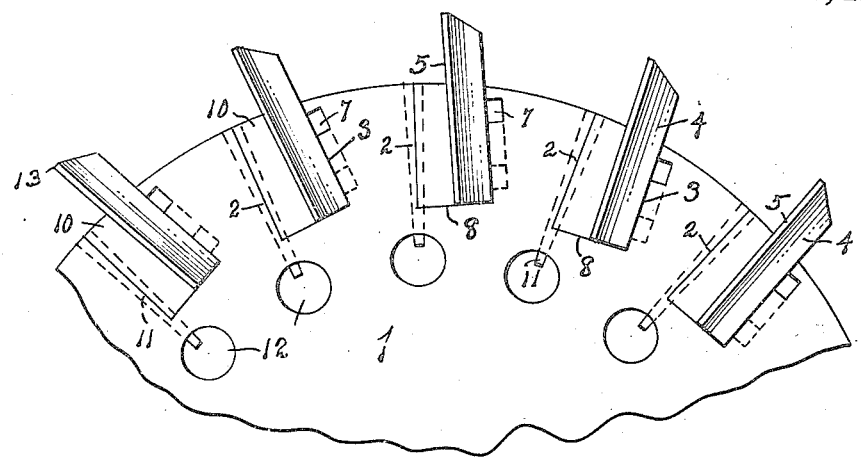
Fig. 1
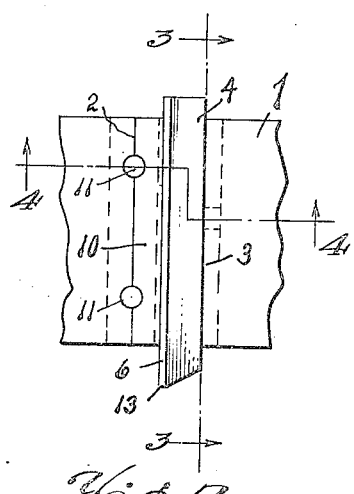
Fig. 2
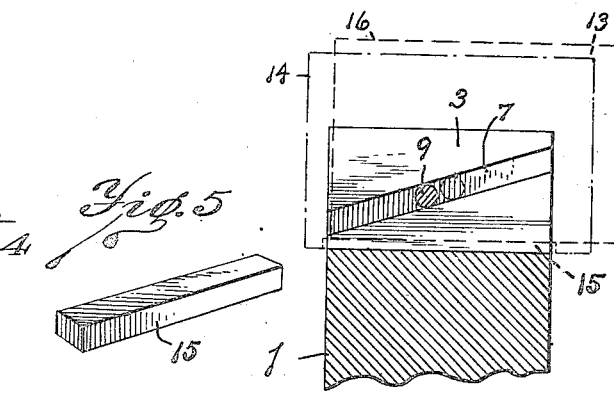
Fig. 5
Fig. 3
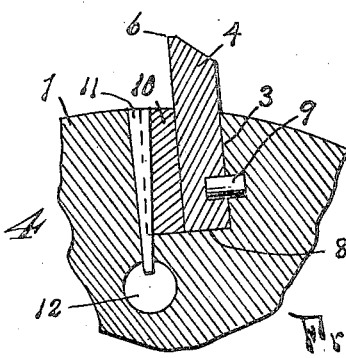
Fig. 4
INVENTOR
Frederick Wiard
BY Edward N. Pagelsen
ATTORNEY.

UNITED STATES PATENT OFFICE.

FREDERICK WIARD, OF DETROIT, MICHIGAN, ASSIGNOR TO AMERICAN STANDARD TOOL COMPANY, OF DETROIT, MICHIGAN, A CORPORATION OF MICHIGAN.

MILLING-CUTTER.

1,397,119.  Specification of Letters Patent.  Patented Nov. 15, 1921.

Application filed January 19, 1921. Serial No. 438,311.

*To all whom it may concern:*

Be it known that I, FREDERICK WIARD, a citizen of the United States, and residing at Detroit, in the county of Wayne and State of Michigan, have invented a new and Improved Milling-Cutter, of which the following is a specification.

This invention relates to means for adjustably securing the teeth of milling cutters, and its object is to provide simple and efficient means for rigidly locking such teeth in position.

This invention consists in a cylindrical cutter body having a series of longitudinal notches whose bottoms are parallel to the axis of the cutter, whose front faces are substantially radial and provided with inwardly tapering grooves and whose rear faces are parallel to the front faces and provided with grooves which are at a slight angle to the bottoms, adjustable teeth having projections extending into said inclined grooves, locking blocks in said slots in front of the teeth and having tapering grooves registering with the grooves in the front faces of the slots, and tapering pins to lock the blocks and teeth in position, the front faces of the teeth inclining forwardly because of being spaced back of the radial planes by means of the locking blocks.

It also consists in the details of construction illustrated in the accompanying drawing and particularly pointed out in the claims.

In the drawing, Figure 1 is an end elevation of a portion of this improved cutter. Fig. 2 is the plan of a tooth and the means for securing it in position. Figs. 3 and 4 are sections on the lines 3—3 and 4—4 of Fig. 2. Fig. 5 is an elevation of a spacing strip.

Similar reference characters refer to like parts throughout the several views.

The body 1 of the present milling cutter is cylindrical and is formed with a series of evenly spaced longitudinal notches whose front faces 2 are preferably substantially radial and whose rear faces 3 are preferably parallel to the front faces although these faces may be inclined in any desired manner. The cutting teeth 4 have parallel front and back faces and may be formed with outer and side cutting edges 5 and 6 respectively.

The rear faces 3 of the notches are formed with inclined grooves 7 which are preferably at an angle of about twenty degrees to the bottoms 8 of these slots which are parallel to the axis of the cutter and the teeth have projections 9 slidable in these grooves. Locking blocks 10 fit between the teeth and the front faces 2 of the grooves and these blocks and the faces 2 are formed with registering tapering grooves to receive the tapering locking pins 11. The body 1 has longitudinal holes 12 to receive proper tools by means of which the pins 11 may be driven out.

The teeth 4 represented in the drawing are especially adapted for facing work and the corners 13 wear faster than the remainder of the teeth. As the teeth are ground along these edges 5 and 6, the distance between them and the body finally becomes too small to properly permit the chips to escape. The pins 11 are then driven out to release the blocks 10 and the teeth 4 which are then slid laterally and outwardly, as indicated by the two sets of dotted lines 14 and 16 in Fig. 3, after which spacing strips 15 are inserted below the teeth, which are then locked in place as before. These strips 15 and the projections 9 on the teeth extending into the grooves 7 determine the distance the teeth extend beyond the end and the periphery of the body of the cutter when in their new positions. While the projections 9 are shown to be cylindrical, they are given this form merely for convenience. It will be observed that the spacing strips 15 are the width of the cutting blades alone and that the locking blocks 10 remain in their original positions.

The details may all be modified by those skilled in the art without departing from the spirit of my invention as set forth in the following claims.

I claim:—

1. In a milling cutter, a body having longitudinal slots whose rear faces are formed with grooves slightly inclined to the axis of the cutter, teeth within the slots and provided with projections extending into said grooves, a locking block for each tooth, the front walls of the slots and said locking blocks being formed with radial grooves, and locking pins in said grooves.

2. In a milling cutter, a body having longitudinal slots whose front walls are radial and formed with radial grooves, the rear walls of the slots being parallel to the front walls and having inclined grooves at less than forty-five degrees to the axis of the cutter, teeth mounted in said slots and having projections extending into said grooves, locking blocks in the slots and provided with radial grooves in their front faces, and pins to lock the blocks and teeth in position.

3. In a milling cutter, a body having longitudinal slots whose front walls are radial and formed with radial grooves, the rear walls of the slots being parallel to the front walls and having inclined grooves at less than forty-five degrees to the axis of the cutter, teeth mounted in said slots and having projections extending into said grooves, locking blocks in the slots and provided with radial grooves in their front faces pins to lock the blocks and teeth in position, and spacing strips adapted to lie in said slots beneath the teeth.

FREDERICK WIARD.